(12) United States Patent
Michaelis et al.

(10) Patent No.: US 11,022,702 B2
(45) Date of Patent: Jun. 1, 2021

(54) IMPROVING AZIMUTH DETERMINATION ACCURACY USING MULTIPLE GNSS ANTENNAS

(71) Applicant: CommScope Technologies LLC, Hickory, NC (US)

(72) Inventors: Scott Michaelis, Plano, TX (US); Sammit Patel, Dallas, TX (US); Andrea Moro, Desio (IT); Alessandro Sinicco, Monza (IT); George P. Vella-Coleiro, Summit, NJ (US)

(73) Assignee: CommScope Technologies LLC, Hickory, NC (US)

( * ) Notice: Subject to any disclaimer, the term of this patent is extended or adjusted under 35 U.S.C. 154(b) by 400 days.

(21) Appl. No.: 16/060,844

(22) PCT Filed: Jan. 5, 2017

(86) PCT No.: PCT/US2017/012293
§ 371 (c)(1),
(2) Date: Jun. 8, 2018

(87) PCT Pub. No.: WO2017/120304
PCT Pub. Date: Jul. 13, 2017

(65) Prior Publication Data
US 2018/0372881 A1 Dec. 27, 2018

Related U.S. Application Data

(60) Provisional application No. 62/276,305, filed on Jan. 8, 2016.

(51) Int. Cl.
*G01S 19/54* (2010.01)
*G01S 19/53* (2010.01)
(Continued)

(52) U.S. Cl.
CPC ............ *G01S 19/54* (2013.01); *G01S 19/246* (2013.01); *G01S 19/30* (2013.01); *G01S 19/43* (2013.01);
(Continued)

(58) Field of Classification Search
CPC .... G01S 19/53–55; G01S 19/14; G01S 19/22; H01Q 1/125; H01Q 1/246
See application file for complete search history.

(56) References Cited

U.S. PATENT DOCUMENTS 5,940,026 A 8/1999 Popeck
6,182,011 B1 1/2001 Ward
(Continued)

FOREIGN PATENT DOCUMENTS

| EP | 2 784 511 A1 | 1/2014 | |
|---|---|---|---|
| EP | 2784533 A1 | 10/2014 | |
| GB | 2379110 A * | 2/2003 | ............ G01S 5/0247 |

OTHER PUBLICATIONS

International Search Report and Written Opinion of the International Searching Authority, International Application No. PCT/US2017/012293, dated Mar. 22, 2017, 14 pp.
(Continued)

*Primary Examiner* — Cassi J Galt
(74) *Attorney, Agent, or Firm* — Myers Bigel, P.A.

(57) ABSTRACT

Aspects of the present disclosure may improve the accuracy of the known azimuth determination techniques by employing more than two GNSS antennas positioned on a base station antenna. Techniques may use one or more combinations of the GNSS antennas to determine an azimuth of the base station antenna, which serve to improve accuracy of an azimuth determination.

5 Claims, 5 Drawing Sheets

(51) Int. Cl.
  *G01S 19/24* (2010.01)
  *G01S 19/30* (2010.01)
  *G01S 19/43* (2010.01)
  *H01Q 1/24* (2006.01)
  *H01Q 1/12* (2006.01)
  *G01S 19/22* (2010.01)

(52) U.S. Cl.
  CPC ............... *G01S 19/53* (2013.01); *G01S 19/22* (2013.01); *H01Q 1/125* (2013.01); *H01Q 1/246* (2013.01)

(56) References Cited

U.S. PATENT DOCUMENTS

| | | | |
|---|---|---|---|
| 6,421,003 B1* | 7/2002 | Riley | G01S 5/0247 |
| | | | 342/357.38 |
| 6,816,710 B2 | 11/2004 | Krasner | |
| 7,480,325 B1 | 1/2009 | Yu et al. | |
| 7,555,033 B2 | 6/2009 | Lillo et al. | |
| 7,852,905 B2 | 12/2010 | Underbrink et al. | |
| 9,094,266 B2 | 7/2015 | Bialer et al. | |
| 9,342,075 B2* | 5/2016 | Nakamura | G05D 1/0206 |
| 2001/0043644 A1 | 11/2001 | Dooley et al. | |
| 2005/0200522 A1 | 9/2005 | Boucher | |
| 2007/0126629 A1* | 6/2007 | Krikorian, V | G01S 19/54 |
| | | | 342/359 |
| 2008/0018545 A1 | 1/2008 | Kaplan et al. | |
| 2009/0201203 A1 | 8/2009 | Le Sage et al. | |
| 2010/0176992 A1* | 7/2010 | T'siobbel | G01S 19/425 |
| | | | 342/357.25 |
| 2011/0201357 A1 | 8/2011 | Garrett et al. | |
| 2013/0127657 A1 | 5/2013 | Zhao et al. | |
| 2015/0048973 A1* | 2/2015 | Whitehead | G01S 19/20 |
| | | | 342/357.58 |
| 2015/0091754 A1 | 4/2015 | Komaili et al. | |

OTHER PUBLICATIONS

Mohiuddin et al., "High-Altitude Satellite Relative Navigation Using Carrier-Phase Differential Global Positioning System Techniques", Journal of Guidance, Control and Dynamics, vol. 30, No. 5, Sep.-Oct. 2007, pp. 1427-1436.

O'Driscoll, "Carrier phase and its measurement for GNSS", Inside GNSS, Jul./Aug. 2010, pp. 18-22.

Wikipedia Contributors, "Analytic signal", Wikipedia, the Free Encyclopedia, downloaded May 13, 2018 from https://en.wikipedia.org/w/index.php?title=Analytic_signal&oldid=833318013, 9 pp.

Extended European Search Report issued in connection with corresponding European Application No. 17736307.4, dated Sep. 19, 2019 (5 pages).

First Examination Report issued in connection with corresponding Indian Application No. 201827024216, dated Feb. 25, 2021 (6 pages).

\* cited by examiner

IMPROVING AZIMUTH DETERMINATION ACCURACY USING MULTIPLE GNSS ANTENNAS

CROSS-REFERENCE TO RELATED APPLICATIONS

This application is a 35 U.S.C. § 371 national stage application of PCT Application No. PCT/US2017/012293, filed on Jan. 5, 2017, which itself claims priority from and the benefit of U.S. Provisional Patent Application No. 62/276,305, filed Jan. 8, 2016, the disclosures of both of which are hereby incorporated herein in their entireties. The above-referenced PCT Application was published in the English language as International Publication No. WO 2017/120304 A1 on Jul. 13, 2017.

BACKGROUND

The present disclosure relates to base station antenna, and, more particularly, to apparatus for determining an azimuth pointing direction of a base station antenna.

In order to provide radio signals throughout a defined area, each directional antenna in a cellular communications system is intended to face a specific direction (referred to as "azimuth") relative to true north, to be inclined at a specific downward angle with respect to the horizontal in the plane of the azimuth (referred to as "tilt" aka "pitch"), and to be vertically aligned with respect to the horizontal (referred to as "roll" aka "skew").

Alignment tools exist today to facilitate the alignment of the azimuth pointing direction of a base station antenna. One conventional alignment tool uses global positioning system ("GPS") satellites. More specifically, one or more GPS antennas may be attached to a base station antenna. Based on signals received from GPS satellites and the locations of the GPS antennas on the base station antenna, the alignment tool may determine the azimuth pointing direction of the base station antenna. However, due to the high cost, these alignment tools are typically removed after installation of the base station antenna.

Unfortunately, undesired changes in azimuth, tilt, and roll may detrimentally affect the coverage of a directional antenna such as a base station antenna. Among other characteristics, an antenna's azimuth pointing direction can change over time, due to the presence of high winds, corrosion, poor initial installation, vibration, hurricanes, tornadoes, earthquakes, or other factors.

Therefore, it would be desirable if there existed a technique that would monitor an azimuth pointing direction of the antenna after installation.

SUMMARY

Aspects of the present disclosure may improve the accuracy of the known azimuth pointing direction determination techniques by employing more than two GNSS antennas positioned on a base station antenna. In an aspect, techniques may use one or more combinations of the GNSS antennas to determine an azimuth pointing direction of the base station antenna.

BRIEF DESCRIPTION OF THE DRAWINGS

The following detailed description of the invention will be better understood when read in conjunction with the appended drawings. It should be understood, however, that the invention is not limited to the precise arrangements and instrumentalities shown. In the drawings.

DETAILED DESCRIPTION

Certain terminology is used in the following description for convenience only and is not limiting. The words "lower," "bottom," "upper" and "top" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
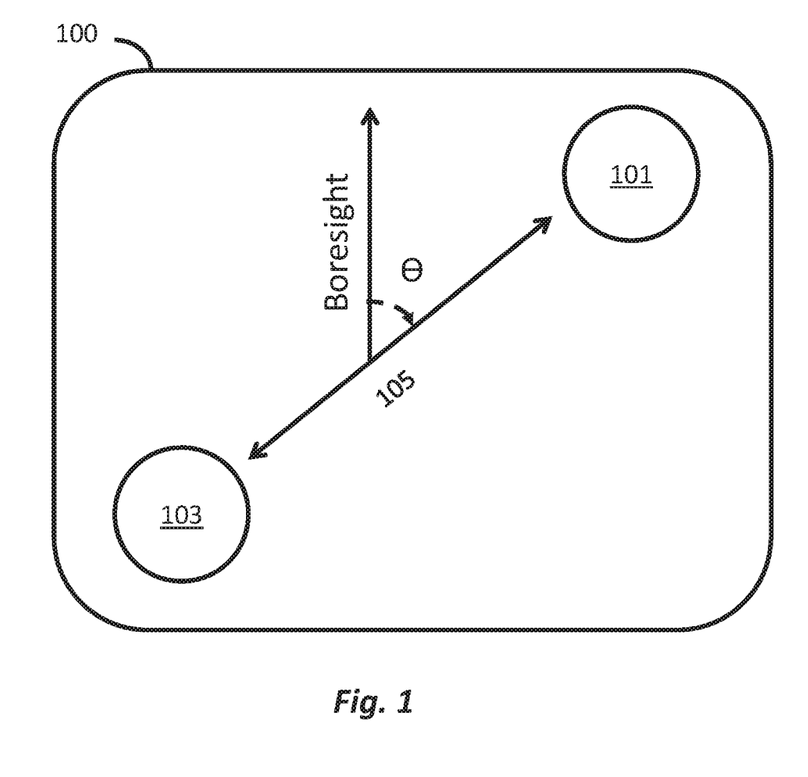
FIG. 1 is a schematic top view of a base station antenna with two Global Navigation Satellite System ("GNSS") antennas that may be used to determine an azimuth pointing direction of the base station antenna.

As discussed above, undesired changes in a pointing direction of a base station antenna may occur after installation of the base station antenna. To address these post installation issues, techniques may include Global Navigation Satellite System (GNSS) antennas. For example, as shown in FIG. 1, one technique may employ two GNSS antennas 101, 103 mounted on top of a base station antenna 100. Each of the two GNSS antennas 101, 103 may include a receiver, and, using these components, a precise location of each GNSS antenna 101, 103 may be determined. Each of the two GNSS antennas 101, 103 may receive signals from one or more GPS satellites.

A processor (not shown) within one or more of the GNSS antennas 101, 103, or separate from the GNSS antennas 101, 103, may parse the received GPS satellite signals to obtain carrier phase information, carrier wavelength information, and satellite ephemeris information. Using the position information of each GNSS antenna 101, 103, and the parsed satellite signal information, the processor may obtain the azimuth pointing direction of an imaginary baseline 105 that extends from GNSS antenna 101 to GNSS antenna 103. The azimuth pointing direction of the base station antenna 100 may then be calculated from a known azimuth angle deviation based on a consistent mechanical placement of the GNSS antennas 101, 103. Details of such calculations may be found in U.S. Pat. Pub. No. 2013/0127657 to Zhao et al., the entire contents of which are incorporated herein in their entirety.

The accuracy of the above discussed techniques may be dependent, at least in part, on the distance between the GNSS antennas 101, 103. More specifically, the farther apart the GNSS antennas 101, 103, the more accurate the azimuth pointing direction determination of the base station antenna 100. Generally, if the GNSS antennas 101, 103 are dozens of meters apart, a single azimuth calculation based on a single set of positional readings of the GNSS antennas 101, 103 may be relatively accurate, with an error of less than 1°. However, as the distance between the two GNSS antennas 101, 103 shortens, the accuracy of the azimuth pointing direction determination decreases.

To compensate for these inaccuracies, multiple position samples of the GNSS antennas 101, 103, and multiple azimuth pointing direction determinations between the same, may be taken. These multiple samples may be averaged to provide an averaged azimuth pointing direction, which statistically may be much more accurate than an azimuth pointing direction determination that is based on a single sample. The inaccuracies in the determined azimuth pointing direction may be further reduced if the samples are taken and averaged over greater periods of time.

Figure 2:
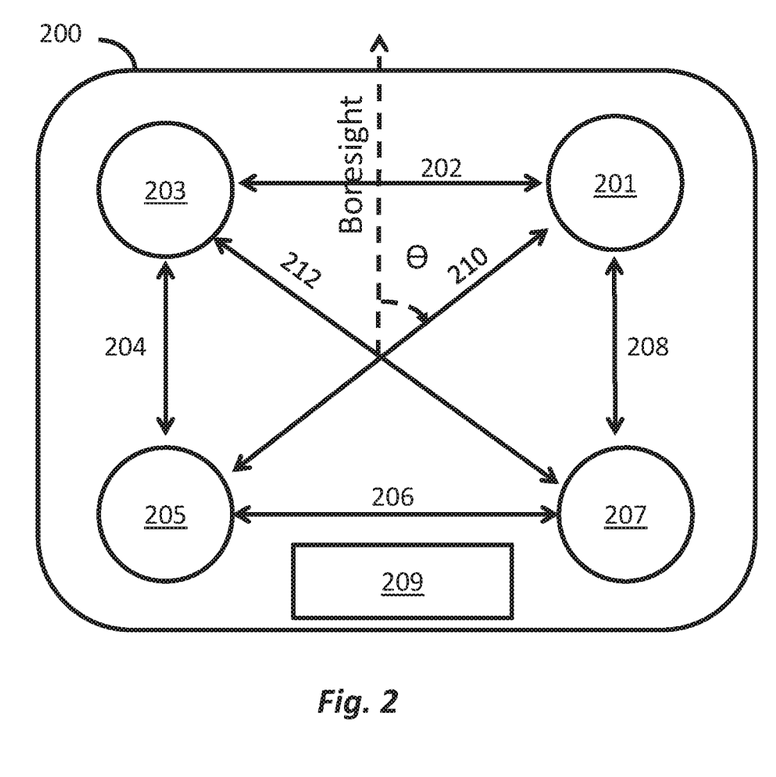
FIG. 2 is a schematic top view of a base station antenna employing four GNSS antennas used to determine an azimuth pointing direction of the base station antenna according to an aspect of the present disclosure.

Aspects of the present disclosure may improve the accuracy of the known azimuth pointing direction determination techniques by employing more than two GNSS antennas. Referring now to FIG. 2, a top of a base station antenna 200 including four GNSS antennas 201, 203, 205, 207 is shown. With four GNSS antennas, at least six different azimuth angles may be computed, namely the azimuth angles of baselines 202, 204, 206, 208, 210 and 212 that are illustrated in FIG. 2. One or more processors 209 may be coupled to each of the GNSS antennas 201, 203, 205, 207. The processor 209 may also be positioned anywhere proximate the base station antenna 200, or remote from the base station antenna 200 in keeping with the invention.

The processor 209 may monitor the number of satellites that each of the GNSS antennas 201, 203, 205, 207 is receiving signals from at any given moment in time, and select two of the GNSS antennas 201, 203, 205, 207 that are tracking the greatest number of GPS satellites. The azimuth pointing direction may then be determined using the selected two GNSS antennas.

Alternatively, all six azimuth angles may be determined using the four GNSS antennas 201, 203, 205, 207 including the azimuth angles of: baseline 202 (using GNSS antennas 201, 203), baseline 204 (using GNSS antennas 203, 205), baseline 206 (using GNSS antennas 205, 207), baseline 208 (using GNSS antennas 201, 207), baseline 210 (using GNSS antennas 201, 205), and baseline 212 (using GNSS antennas 203, 207).

In some embodiments, a weighting factor may be applied to "weight" the azimuth angles using the GNSS antennas tracking the greatest number of satellites. An algorithm may then be applied to calculate a weighted average to determine the most likely azimuth pointing direction of the base station antenna 200.

As yet another alternative, an average of all above discussed azimuth angles may be calculated and a base station antenna azimuth pointing direction may be determined directly from the same. It should be noted that other variations of the above calculations, for example, using any combination of one or more of the GNSS antennas 201, 203, 205, 207 to determine the azimuth pointing direction of the base station antenna 200 may be used in keeping with the disclosure. It should also be noted, that according to aspects of the present disclosure, more or fewer GNSS antennas may be provided on the base station antenna 200 and used in the azimuth pointing direction determination.

The accuracy of a determination of the azimuth pointing direction of a base station antenna may be compromised in instances when a view between the base station antenna and one or more satellites is obstructed due to buildings or other structures. Such obstructions may cause signals transmitted by one or more of the GPS satellites to reflect off the structures, before ultimately arriving at the base station antenna, or, in other words, create an undesirable multipath effect, instead of the preferred direct path to the base station antenna.

Figure 3:
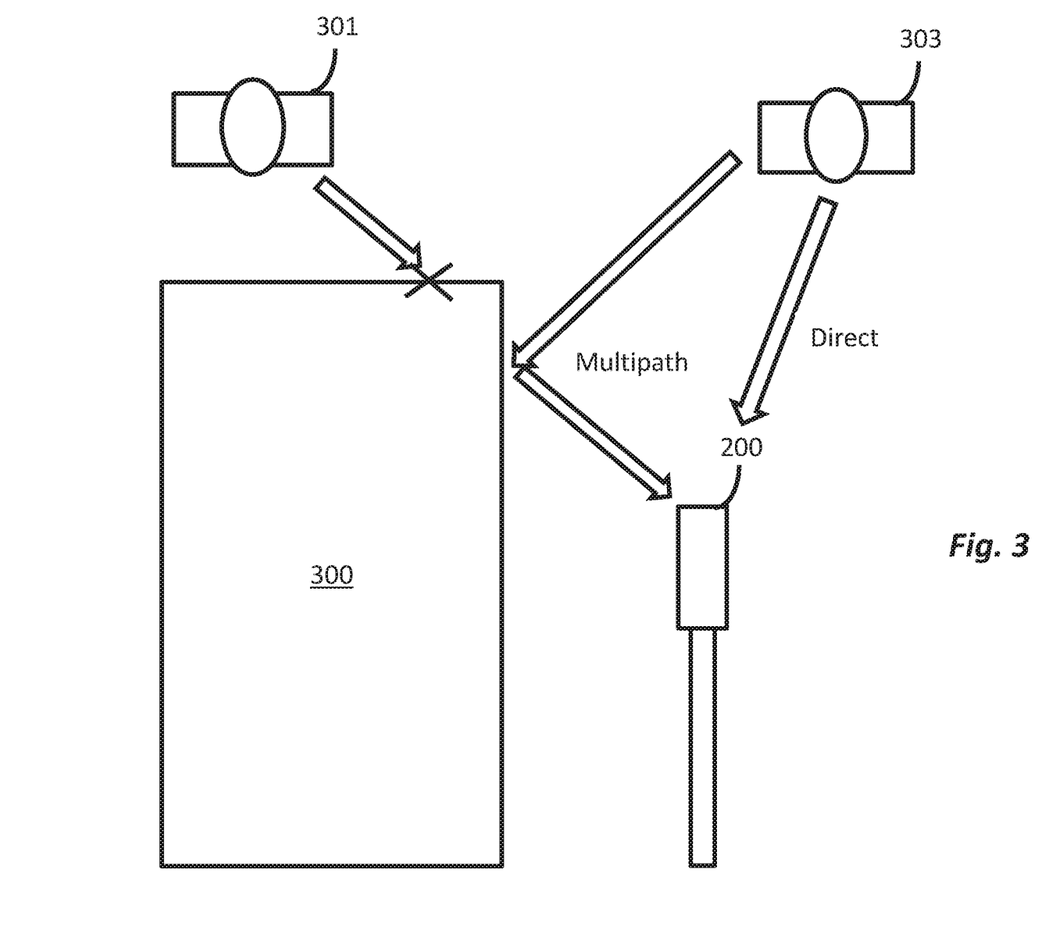
FIG. 3 is a schematic illustration of a base station antenna attempting to receive signals from GPS satellites.

An illustration of such a scenario is shown in FIG. 3, which is a schematic side view of a base station antenna 200 that is installed near a structure 300. The structure 300 may be, for example, a building, tower or other man made structure, or a terrain feature such as a tree, hill or mountain. Because of the structure 300, a portion of the sky may be obstructed from view from the vantage point of the base station antenna 200. Consequently, satellites in the obstructed part of the sky may not be as effective in calculating the azimuth pointing direction of the base station antenna 200. Moreover, due to the presence of the structure 300, some signals from the GPS satellite 303 may arrive at one or more GNSS antennas (shown, for example, in FIG. 2 or 4) on the base station antenna 300 only after reflecting off the structure 300. This multipath effect may create errors in calculating the azimuth pointing direction of the base station antenna 200.

Because any signals from the GPS satellite 301 may be obstructed by the structure 300 so that they are not received at the base station antenna, these signals may be useless for determining the azimuth pointing direction of the base station antenna 200. Also, as discussed above, any reflected signals may compromise accuracy of azimuth pointing direction determination. As such, it may be desirable to ignore, or otherwise block, any signals coming from the GPS satellite 301. It may also be desirable to increase the signal strength of signals received in a direct path from the GPS satellite 303.

Figure 4:
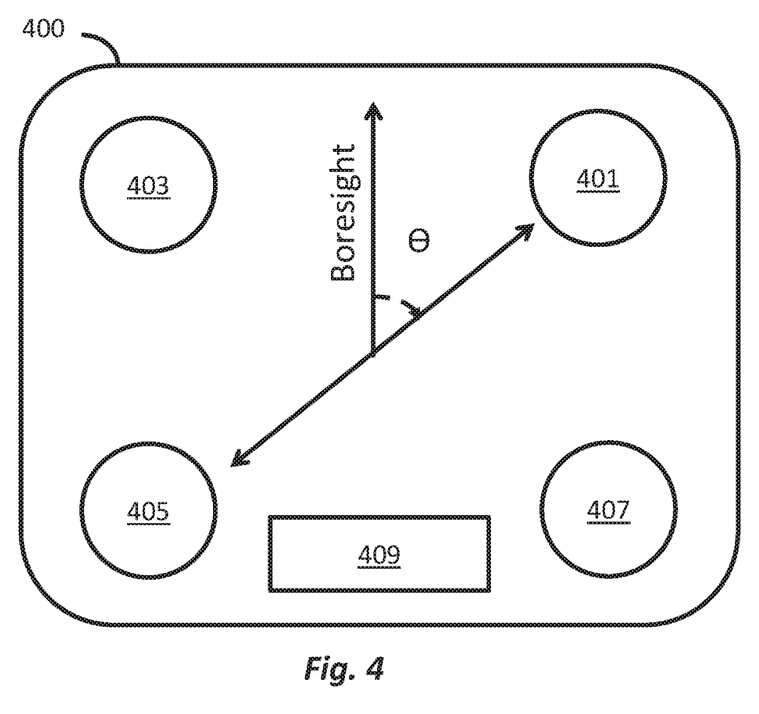
FIG. 4 is a schematic top view of a base station antenna employing four GNSS antennas used to create phased arrays for determining an azimuth pointing direction of the base station antenna, according to an aspect of the present disclosure.

To accomplish this, the GNSS antennas provided on the base station antenna 200 may be used to form phased arrays. For example, the amplitude and/or phase of signals received by the GNSS antennas may be adjusted using complex weights, and/or other phase adjusting means as known in the art, so that the GNSS antennas operate together as a single phased array antenna. When the GNSS antennas are operated as a phased array antenna, the number and/or signal strength of signals from GPS satellites arriving from the above discussed blocked region may be reduced, and/or the signal strength of signals received through an area of open sky may be increased. Referring now to an example, FIG. 4 is a schematic view of the top of a base station antenna 400 that has four GNSS antennas 401, 403, 405, 407, and a processor 409 coupled thereto. Using the processor 409, the GNSS antennas 401, 403, 405, 407 may be combined together to form two 2×1 phased array antennas. For example, GNSS antennas 401 and 403 may be combined together to provide the two 2×1 phased array antennas. The phased array antennas may be used to receive signals from the GPS satellites, and to determine an azimuth pointing direction of the base station antenna based on calculated position information (e.g., of the phased array antennas), in a manner similar to the techniques that are discussed above for individual GNSS antennas. Other combinations of GNSS antennas 401, 403, 405, and 407 may be used to create other phased array antennas in keeping with the spirit of the disclosure. Moreover, more or fewer GNSS antennas may be employed. Even thought the processor 409 is shown as being on top of the base station antenna 400, it may be positioned anywhere proximate the base station antenna 400, or remote from the base station antenna 400 in keeping with the present disclosure. If the processor 409 is remote from the base station antenna, it may communicate (such as via a communications interface) with the GNSS antennas 401, 403, 405, 407 through any form of communication as known in the art.

Figure 5:
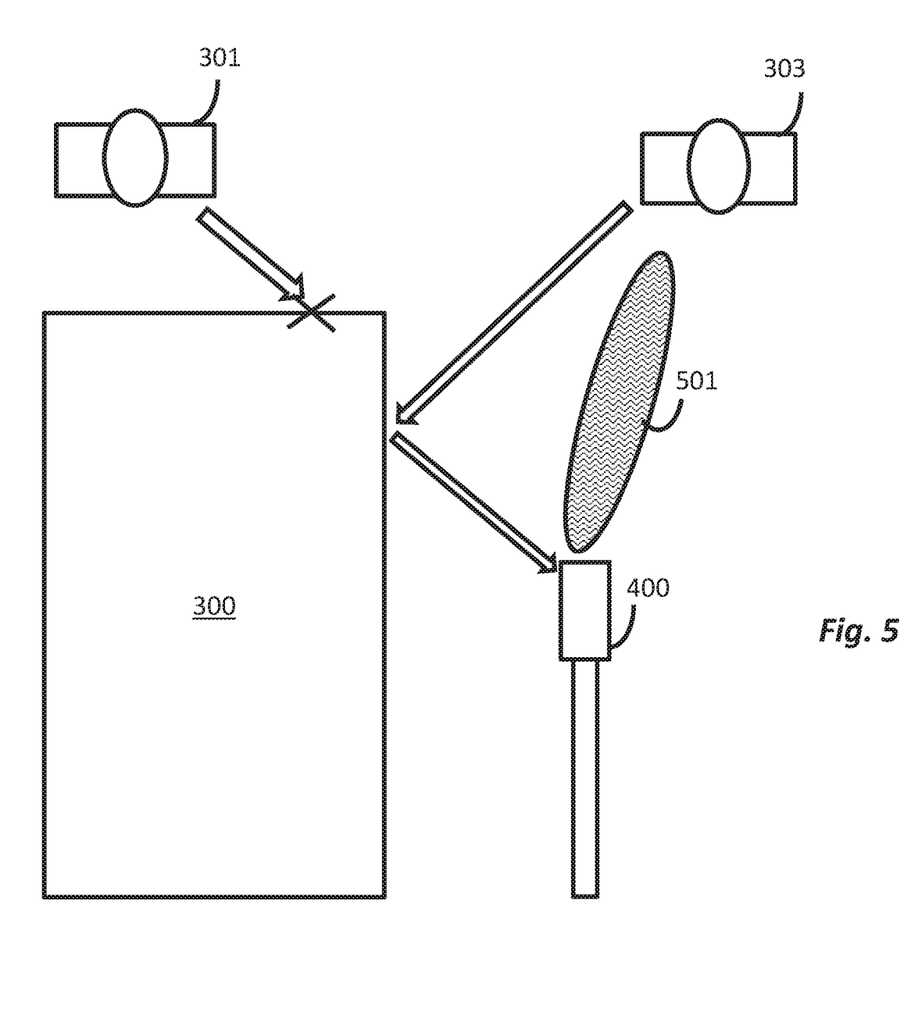
FIG. 5 is a schematic illustration of a base station antenna employing GNSS antennas configured to steer a beam to receive signals from a GPS satellite according to an aspect of the present disclosure.

The phases of signals received at each GNSS antenna 401, 403, 405, 407 may be adjusted to create a higher gain antenna beam and to electronically steer this antenna beam to be directly overhead, tilted to the left, or tilted to the right to best avoid sources of multipath, and to increase the strength of received signals in direct line of sight paths. For example, as shown in FIG. 5, phased arrays can be configured to tilt an antenna beam 501 that is generated by base station antenna 400 away from the structure 300, thereby increasing the signal strength of signals received by the GNSS antenna 401, 403, 405, 407 along a direct line-of-sight path from the GPS satellite 303, while reducing the signal strength of signals from the GPS satellite 303 that are received by the GNSS antenna 401, 403, 405, 407 after reflecting off of one or more obstacles.

It should be noted that these phased array antennas could be built in hardware or in software as signals are being processed. Using the combinations of at least two separate phased array antennas, at least two calculated positions can be determined from which an azimuth pointing direction can be computed.

To steer the antenna beam generated by a phased array antenna in a desired direction such as, for example, away from an obstacle, the direction of the obstacle may need to be known prior to the manufacture or installation of the phased array antenna. As such, according to aspects of the present disclosure, a direction of an obstacle, or a desired pointing direction for an antenna beam generated by the phased array antenna, may be input by, for example, an installer of the base station antenna. Alternatively, the system may gather information over time regarding the optimal direction for GPS signal reception, and adapt accordingly, or "learn" over time. For example, the location of the GPS satellites may be known to the processor that calculates the azimuth pointing direction of the base station antenna. If over a period of time, the processor "learns" that it only sees satellites in a certain region of the sky, it may create a phased array antenna to take advantage of that knowledge to minimize error from multipath signals. Further, it should be noted that, periodically, an antenna beam of the phased array antenna may be electronically steered to see if the presence or position of particular obstacles has changed, and then new phased array antennas may be constructed based on such changes.

It should be noted that the techniques and apparatus described hereinthoughout may allow for determination of the azimuth pointing direction of the base station antenna after the base station antenna is installed on an associated apparatus such as, for example, an antenna tower. Such techniques and apparatus may work in conjunction with the Antenna Interface Standards Group (AISG), which may allow for querying, such as by one or more controllers, to obtain the azimuth pointing direction for the base station antenna, or other information from which the azimuth pointing direction may be determined, as well as to provide alarms when the azimuth pointing direction has moved beyond a certain threshold position. It also should be noted that the techniques and apparatus described hereinthroughout may be beneficial for more accurate initial installations as well.

Carrier Phase

As discussed above, determining an azimuth pointing direction of a base station antenna using a plurality of GNSS antennas may involve measurement of a difference of a carrier phase between the GNSS antennas for each GPS satellite in view. The carrier phase difference data may be combined with position data of the antennas and satellites (e.g., obtained from each satellite's ephemeris). To determine the carrier phase for each GNSS antenna, a conventional approach may use a tracking phase locked loop (PLL), as described, for example, in "Carrier phase and its measurement for GNSS," Inside GNSS, by C. O'Driscoll, July/August 2010, the entire contents of which are incorporated herein in their entirety. This conventional approach, however, may be susceptible to cycle slips, or half cycle slips, which may occur when the PLL momentarily loses lock, which may result in a cycle, or a portion thereof, of lost phase information.

To obtain an accurate carrier phase determination, such complete cycle and half cycle slips may need to be detected and corrected. Techniques for such detection and correction, are described in "High-altitude satellite relative navigation using carrier-phase differential Global Positioning System techniques," Journal of Guidance, Control, and Dynamics, Vol. 30, No. 5, September-October 2007, by S,. Mohiuddin and M. L. Psiaki, the entire contents of which are incorporated herein in their entirety. These techniques, however, may result in considerable data processing complexity.

According to aspects of the present disclosure, cycle and half cycle slips may be avoided. More specifically, the carrier phase difference between two GNSS antennas may be obtained directly from an intermediate frequency (IF) or baseband output of the two GNSS antennas. To accomplish this, the signals received from each GPS satellite may be de-spread using a pseudo-random code for the satellite and the code phase determined from the acquisition of each satellites' signal or the tracking loop of the satellite's signal. If the satellite signals are real-values, they may be converted to complex-valued analytic signals using techniques as known in the art.

The following formula may be used to determine a satellite signal received by a first GNSS receiver $S1(n)$ and from a second GNSS receiver $S2(n)$, where n is the sample number, "*" denotes matrix multiplication, and S2H(n) denotes the Hermitian transpose of $S2(n)$.

$$S S1(n)*S2H(n)$$

A least squares best fit estimate of the carrier phase difference "theta" may be obtained from the following formula:

$$\text{theta}=\arctan(I(S)/R(S)),$$

where I(S) is the imaginary component of S, and R(S) is the real component of S. It should be noted that the calculated carrier phase difference, theta, may be filtered to reduce an effect of noise. For example, one or more bandpass filters may be applied to IF signals used to obtain the carrier phase difference. Alternatively, one or more lowpass filters may be applied to baseband signals used to obtain the carrier phase difference. To reduce the number of filter coefficients, prior to filtering, it may be beneficial to decimate the IF and/or baseband signals to a lower sampling rate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative blocks, modules, circuits, and algorithm steps described in connection with the embodiments disclosed herein may be implemented as electronic hardware, computer software, or combinations of both. Computer software may be stored in a computer readable storage medium. The computer readable storage medium may be a magnetic disk, a compact disk, a read-only memory (Read-Only Memory, ROM), or a random access memory (Random Access Memory, RAM), and so on. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative blocks described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

What is claimed is:

1. A method of determining an azimuth pointing direction of a base station antenna, the method comprising:
    providing a base station antenna that includes a first Global Navigation Satellite System ("GNSS") antenna, a second GNSS antenna, a third GNSS antenna and a fourth GNSS antenna mounted thereon, where a first imaginary line extends between the first and second GNSS antenna, a second imaginary line extends between the first and third GNSS antenna, a third imaginary line extends between the first and fourth GNSS antenna, a fourth imaginary line extends between the second and third GNSS antenna, a fifth imaginary line extends between the second and fourth GNSS antenna, and a sixth imaginary line extends between the third and fourth GNSS antenna;
    receiving signals from a plurality of Global Positioning System ("GPS") satellites at the first, second, third and fourth GNSS antenna;
    monitoring the number of GPS satellites from which each GNSS antenna receives a signal;
    determining azimuth angles of at least two of the first through sixth imaginary lines based on the received signals; and
    determining the azimuth pointing direction of the base station antenna based at least in part on the determined azimuth angles of the at least two of the first through sixth imaginary lines by weighting the determined azimuth angles of the at least two of the first through sixth imaginary lines that extend to a one of the first through fourth GNSS antennas that tracks the most GPS satellites more heavily than the azimuth angles associated with another of the GNSS antennas.

2. The method of claim 1, wherein determining azimuth angles of at least two of the first through sixth imaginary lines comprises determining azimuth angles of three of the first through sixth imaginary lines, and wherein determining the azimuth pointing direction of the base station antenna based at least in part on the determined azimuth angles of the at least two of the first through sixth imaginary lines comprises determining the azimuth pointing direction of the base station antenna based at least in part on the determined azimuth angles of the three of the first through sixth imaginary lines.

3. The method of claim 1, wherein determining azimuth angles of at least two of the first through sixth imaginary lines comprises determining azimuth angles of all six of the first through sixth imaginary lines, and wherein determining the azimuth pointing direction of the base station antenna based at least in part on the determined azimuth angles of the at least two of the first through sixth imaginary lines comprises determining the azimuth pointing direction of the base station antenna based at least in part on the determined azimuth angles of the first through sixth imaginary lines.

4. The method of claim 1, wherein the weighting comprises determining a weighted average of the determined azimuth angles.

5. A method of determining an azimuth pointing direction of a base station antenna, the method comprising:
    providing a base station antenna that includes a first Global Navigation Satellite System ("GNSS") antenna, a second GNSS antenna, a third GNSS antenna and a fourth GNSS antenna mounted thereon, where a first imaginary line extends between the first and second GNSS antenna, a second imaginary line extends between the first and third GNSS antenna, a third imaginary line extends between the first and fourth GNSS antenna, a fourth imaginary line extends between the second and third GNSS antenna, a fifth imaginary line extends between the second and fourth GNSS antenna, and a sixth imaginary line extends between the third and fourth GNSS antenna;
    tracking signals from a plurality of Global Positioning System ("GPS") satellites at the first, second, third and fourth GNSS antenna;
    determining a number of GPS satellites that each of the first, second, third and fourth GNSS antenna are tracking;
    selecting two of the first through fourth GNSS antenna that are tracking the greatest number of GPS satellites;

determining azimuth angles of the imaginary lines that extend to the selected two of the first through fourth GNSS antenna; and determining the azimuth pointing direction of the base station antenna by averaging the azimuth angles of the first through sixth imaginary lines that extend to the selected two of the first through fourth GNSS antenna.

* * * * *